US009315098B2

(12) United States Patent
Lee et al.

(10) Patent No.: US 9,315,098 B2
(45) Date of Patent: Apr. 19, 2016

(54) UREA SOLUTION VENTING SYSTEM FOR VEHICLE

(71) Applicant: Hyundai Motor Company, Seoul (KR)

(72) Inventors: Bosung Lee, Whasung-Si (KR); Chang Ho Ham, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 95 days.

(21) Appl. No.: 14/335,703

(22) Filed: Jul. 18, 2014

(65) Prior Publication Data

US 2015/0167529 A1    Jun. 18, 2015

(30) Foreign Application Priority Data

Dec. 17, 2013   (KR) .................. 10-2013-0157653

(51) Int. Cl.
*B60K 15/01* (2006.01)
*B60K 15/035* (2006.01)
*F01N 3/20* (2006.01)

(52) U.S. Cl.
CPC ........... *B60K 15/03519* (2013.01); *B60K 15/01* (2013.01); *F01N 3/208* (2013.01); *F01N 2610/02* (2013.01); *F01N 2610/1466* (2013.01)

(58) Field of Classification Search
CPC ................ F01N 3/208; F01N 2610/02; F01N 2610/1466; B60K 15/01; B60K 15/03519; B60K 2015/0467; B60K 2015/03552; B60K 2015/03566; B67D 7/54
USPC .............. 141/59, 285, 325; 137/588, 624.27; 220/86.2
See application file for complete search history.

(56) References Cited

U.S. PATENT DOCUMENTS

| 5,054,508 | A |   | 10/1991 | Benjey |  |
|---|---|---|---|---|---|
| 5,103,877 | A | * | 4/1992 | Sherwood | B60K 15/03519 123/519 |
| 5,186,220 | A | * | 2/1993 | Scharrer | B60K 15/03519 137/39 |
| 5,687,778 | A | * | 11/1997 | Harris | B60K 15/0406 137/43 |
| 6,167,920 | B1 | * | 1/2001 | Enge | B60K 15/035 141/302 |
| 6,554,031 | B2 | * | 4/2003 | Channing | B60K 15/04 141/100 |
| 8,955,559 | B2 | * | 2/2015 | Hatakeyama | B60K 15/03504 141/44 |
| 8,960,473 | B2 | * | 2/2015 | Grun | B60K 15/03504 137/588 |
| 2012/0186677 | A1 |  | 7/2012 | Wetzel et al. |  |

FOREIGN PATENT DOCUMENTS

| JP | 7-279788 A | 10/1995 |
|---|---|---|
| KR | 2003-0094276 A | 12/2003 |
| KR | 10-2012-0051660 A | 5/2012 |

* cited by examiner

*Primary Examiner* — Timothy L Maust
(74) *Attorney, Agent, or Firm* — Morgan, Lewis & Bockius LLP (57) ABSTRACT

An urea solution venting system for a vehicle which passes an ammonia component produced from an urea solution supplied for post-processing on an exhaust gas of the vehicle may include an urea solution tank, an urea solution injection pipe that communicates with the urea solution tank to replenish the urea solution tank, a first venting pipe to send an ammonia component produced in the urea solution tank to the urea solution injection pipe, a valve module that has a first outlet for sending the ammonia component in the first venting pipe to the urea solution injection pipe, and has a second outlet through which the ammonia component in the urea solution injection pipe is discharged to the outside, an urea solution injection port to receive an injection gun for injecting an urea solution into the urea solution injection pipe, and a flap that closes the urea solution injection port.

11 Claims, 5 Drawing Sheets

UREA SOLUTION VENTING SYSTEM FOR VEHICLE

CROSS-REFERENCE TO RELATED APPLICATION

This application claims priority to Korean Patent Application No. 10-2013-0157653 filed Dec. 17, 2013, the entire contents of which are incorporated herein for all purposes by this reference.

BACKGROUND OF THE INVENTION

1. Field of the Invention

The present invention relates to a urea solution venting system for a vehicle. More particularly, the present invention relates to a urea solution venting system for a vehicle which prevents ammonia smell from leaking to the outside of a vehicle body.

2. Description of Related Art

In general, post-processing on an exhaust gas for reducing NOX is performed in diesel engines.

Recently, new post-processing has been introduced in association with exhaust gas regulation. The post-processing is a technology of reducing an exhaust gas concerned by not only Korean, but foreign countries, and an EGR SYSTEM and an UREA-SCR (selective catalytic reduction) SYSTEM are typical systems. In particular, the UREA-SCR, a technology that is the most widely used in the post-processing that have been proposed up to now, has relatively better fuel efficiency, activation temperature, and the ratio of purification because it purifies only NOX by spraying an urea solution to an exhaust gas.

The UREA-SCR SYSTEM is described in more detail. It is a technology of reducing NOX in an exhaust gas (HC, CO, PM, NOX) from a diesel engine, and when it sprays an urea solution to an exhaust gas, and the sprayed urea solution is incinerated into NH3 (ammonia) and HNCO (isocyanic acid) by the exhaust gas. Further, HNCO is decomposed into NHC (ammonia) and CO2 (carbon dioxide) by the water in the exhaust gas and the produced NH3 is purified into N2 (nitrogen) and H2O (water) by reacting with NOX through a catalyst.

The UREA-SCR SYSTEM has a urea solution tank that stores a urea solution and the urea tank is filled with a urea solution by injecting a urea solution through a urea inlet.

However, when the ammonia component leaks to the outside of a vehicle body in the direction opposite to the injection of the urea solution through the urea inlet, the worker who injects the urea solution is exposed to the ammonia smell. Accordingly, the environment for the worker who injects a urea solution is bad and the worker may feel unpleasant.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an urea solution venting system for a vehicle having advantages of preventing an ammonia component from leaking to the outside of a vehicle body.

In an aspect of the present invention, an urea solution venting system for a vehicle which passes an ammonia component produced from an urea solution supplied for post-processing on an exhaust gas of the vehicle, may include an urea solution tank that stores an urea solution, an urea solution injection pipe that communicates with the urea solution tank to replenish the urea solution tank with the urea solution, a first venting pipe of which a first end communicates with the urea solution injection pipe and a second end is connected to the urea solution tank in order to send an ammonia component produced in the urea solution tank to the urea solution injection pipe, a valve module that is disposed between the first venting pipe and the urea solution injection pipe and may include a first outlet for sending an ammonia component in the first venting pipe to the urea solution injection pipe, and a second outlet through which an ammonia component in the urea solution injection pipe is discharged to the outside, an urea solution injection port that is formed at a first end of the urea solution injection pipe to receive an injection gun for injecting the urea solution into the urea solution injection pipe, and a flap that is pivotally mounted to the urea solution injection port and selectively closes the urea solution injection port, wherein as the injection gun is inserted into the urea solution injection port, the flap opens the urea solution injection port and closes the first and the second outlets of the valve module by being pushed by the injection gun.

The valve module may include an outer body that communicates with the first venting pipe and the urea solution injection pipe, an inner body that is disposed inside the outer body and communicates with the urea solution injection pipe, and an exhaust valve that is disposed at a first end of the inner body and selectively opens/closes the first end of the inner body, wherein the outer body communicates with the urea solution injection pipe through the first outlet and the inner body communicates with the urea solution injection pipe through the second outlet.

When the flap returns to an initial closed position and the first outlet and the second outlet are opened, with separation of the injection gun, the ammonia component from the first venting pipe flowing in the urea solution injection pipe through the outer body and the ammonia component from the urea solution tank directly flowing to the urea solution injection pipe flow into the inner body.

When the ammonia component flows into the inner body, the exhaust valve opens and the ammonia component in the inner body is discharged inside a vehicle body through the exhaust valve.

The valve module may further include an air inflow valve that is disposed at the first end of the inner body and selectively opens/closes the first end of the inner body, wherein as the air inflow valve opens to take external air into the inner body, the ammonia component is smoothly discharged through the exhaust valve.

The system may further include a venting valve that is disposed on the top of the urea solution tank and selectively discharges the ammonia component produced in the urea solution tank, a liquid filter that communicates with the venting valve, receives a portion of the ammonia component produced in the urea solution tank passing through the venting valve, and collects a liquid-state urea solution in the portion of the ammonia component which passes through the venting valve, and a second venting pipe that communicates with the liquid filter to discharge a gas-state urea solution in the portion of the ammonia component passing through the venting valve and then passing through the liquid filter down along the urea solution tank.

The venting valve may include at least one or more circulation holes through which the ammonia component produced in the urea solution tank flows into the venting valve, a venting hole through which the portion of the ammonia component passing through the venting valve flows out of the venting valve, a connection pipe that communicates with the liquid filter so that a portion of the ammonia component passing through the venting hole is sent to the liquid filter, and a float that is disposed in the venting valve to be lifted by buoyancy, as the urea solution supplied into the urea solution tank rises, wherein as the float is lifted, the circulation holes and the venting hole are closed.

When the first outlet, the second outlet, and the venting hole are closed, the urea solution tank is closed.

The liquid filter may include a filter body of which an entire shape is a cylindrical case, a liquid trap that is disposed in the filter body and filters the liquid-state urea solution in the portion of the ammonia component passing through the liquid filter, and a return valve that selectively opens to return the liquid-state urea solution, which collects on a bottom of the filter body by the liquid trap, to the urea solution tank.

The filter body tapers downward.

The return valve is opened by a weight of the liquid-state urea solution collecting on the bottom of the filter body.

As described above, according to an exemplary embodiment of the present invention, ammonia component produced from urea solution can be prevented from leaking outside a vehicle. Accordingly, the environment for the worker who injects the urea solution into the urea solution tank is improved and the satisfaction of the worker can be improved.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Reference numerals set forth in the Drawings include reference to the following elements as further discussed below.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described with reference to the accompanying drawings so that those skilled in the Field of the Invention to which the present invention pertains may carry out the exemplary embodiment.

Figure 1:
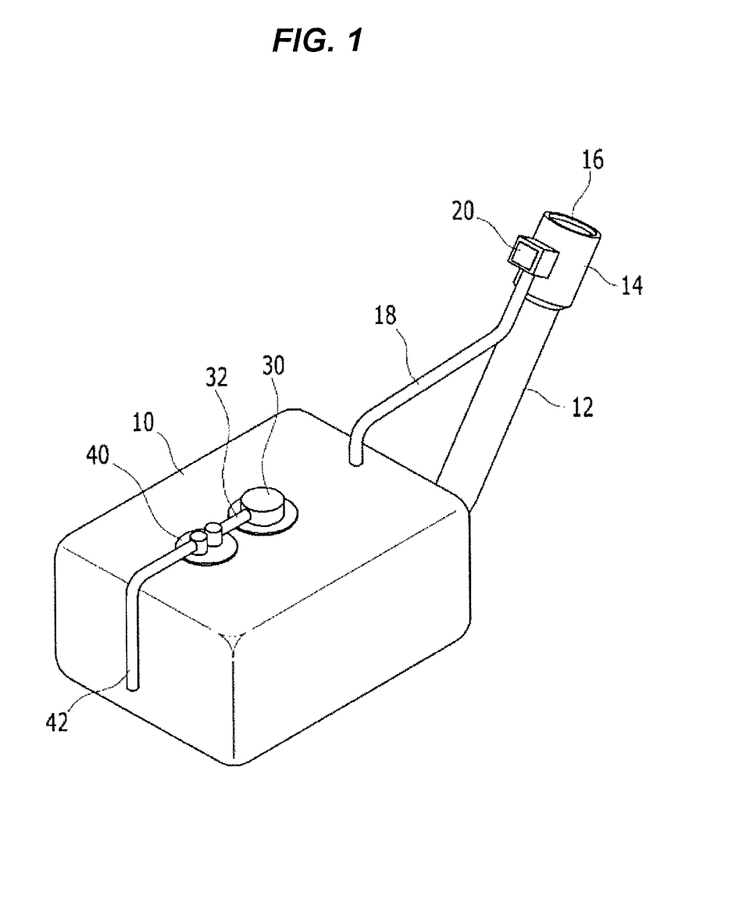
FIG. 1 is a perspective view showing a urea solution venting system for a vehicle according to an exemplary embodiment of the present invention.
Figure 2:
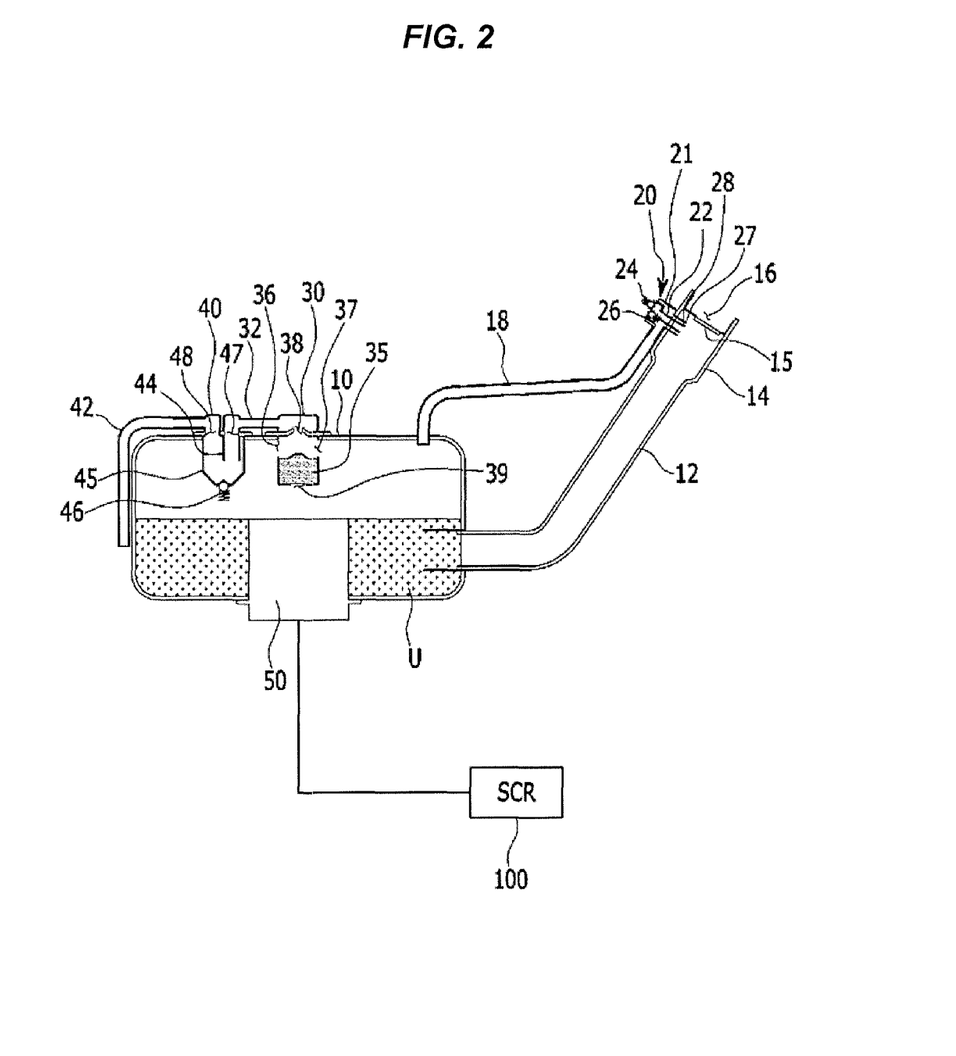
FIG. 2 is a cross-sectional view showing the urea solution venting system for the vehicle according to an exemplary embodiment of the present invention.

FIG. 1 is a perspective view showing a urea solution venting system for a vehicle according to an exemplary embodiment of the present invention and FIG. 2 is a cross-sectional view showing the urea solution venting system for a vehicle according to an exemplary embodiment of the present invention.

As shown in FIGS. 1 and 2, the urea solution venting system for a vehicle according to an exemplary embodiment of the present invention includes an urea solution tank 10, a urea solution injection pipe 12, a first venting pipe 18, a valve module 20, a venting valve 30, a liquid filter 40, a connection pipe 32, a second venting pipe 42, and a pump module 50.

The urea solution tank 10 is a tank where a urea solution U is stored. The urea solution U in the urea solution tank 10 is supplied to an UREA-SCR system 100 for post-processing of an exhaust gas. The UREA-SCR system 100 is well known to those skilled in the art, so the detailed description is not provided.

The urea solution injection pipe 12 is provided to supply a urea solution U to the urea solution tank 10. That is, one end of the urea solution injection pipe 12 is connected with the urea solution tank 10 so that the urea solution injection pipe 12 communicates with the inside of the urea solution tank 10. Further, the urea solution U injected through the other end of the urea solution injection pipe 12 is injected into the urea solution tank 10 through one end of the urea solution injection pipe 12.

The urea solution injection pipe 12 has an injection gun pipe 14, a urea solution injection port 16, and a flap 15.

The injection gun pipe 14 is formed at one end of the urea solution injection pipe 12. The injection gun pipe 14 is a part where an injection gun G for injecting the urea solution U to one end of the urea solution injection pipe 12 is inserted. The injection gun pipe 14 may have a diameter larger than those of other portions of the urea solution injection pipe 12.

The urea solution injection port 16 is a hole that is open at one end of the urea solution injection pipe 12 such that the injection gun G is inserted in the injection gun pipe 14.

The flap 15 is a cover that selectively covers the urea solution injection port 16.

The first venting pipe 18 communicates with the urea solution tank 10. One end of the first venting pipe 18 extends close to the injection gun pipe 14 and communicates with the urea solution injection pipe, and the other end is connected with the top of the urea solution tank 10. That is, the ammonia component produced from the urea solution U in the urea solution tank 10 is discharged from the urea solution tank 10 through the other end of the first venting pipe 18 connected with the top of the urea solution tank 10 and the ammonia component discharged into the first venting pipe 18 is sent to the injection gun pipe 14 through the first venting pipe 18.

The valve module 20 is disposed on the injection gun pipe 14 and connected with one end of the first venting pipe 18.

The valve module 20 has an outer body 21, an inner body 22, exhaust valve 24, an air inflow valve 26, a first outlet 27, and a second outlet 28.

The outer body 21 is a case covering the constituent elements of the valve module 20, with the inside communicating with the first venting pipe 18 and the injection gun pipe 14 and having one end open.

The inner body 22 is a case for a valve inserted through the open end of the outer body 21 and disposed in the outer body 21. The inner body 22 is inserted in the open end of the outer body 21 without a gap. That is, since the inner body 22 is inserted in the outer body 21, the inside of the outer body 21 is divided into the inside and the outside of the inner body 22.

The exhaust valve 24 and the air inflow valve 26 are disposed at one end of the inner body 22 that hermetically closes the open end of the outer body 21.

The exhaust valve 24 allows the fluid in the inner body 22 to be selectively discharged to the outside of the valve module 20 through one end. That is, the exhaust valve 24 is a one-way valve through which fluid can move out from the inside of the inner body 22.

The air inflow valve 26 allows fluid to selectively flow into the valve module 20 through one end of the inner body 22. That is, the air inflow valve 26 is a one-way valve through which fluid can move inside from the outside of the inner body 22.

The first outlet 27 is a hole formed at the other end of the outer body 21 which is connected to the injection gun pipe 14. That is, the inside of the outer body 21 communicates with the injection gun pipe 14 through the first outlet 27.

The second outlet 28 is a hole formed at the other end of the inner body 22 which is connected to the injection gun pipe 14. That is, the inside of the inner body 22 communicates with the injection gun pipe 14 through the second outlet 28.

The second outlet 28 is disposed inside the first outlet 27 such that fluid flows through the space between the first outlet 27 and the second outlet 28. The first outlet 27 and the second outlet 28 may be disposed on the same plane. In other words, both of the first outlet 27 and the second outlet 28 may be closed by a plate.

The venting valve 30 is disposed on the top of the urea solution tank 10. Although the venting valve 30 of which the entire shape is a cylindrical case is shown in FIGS. 1 and 2, it is not limited thereto.

The venting valve 30 has a first circulation hole 36, a second circulation hole 37, a venting hole 38, and a float 35.

The first circulation hole 36 and the second circulation hole 37 are holes formed so that the inside of the venting valve 30 communicates with the inside of the urea solution tank 10. The ammonia component produced in the urea solution tank 10 flows into the venting valve 30 through the first circulation hole 36 and the second circulation hole 37.

The venting hole 38 is a hole formed so that the ammonia component flowing in the venting valve 30 through the first circulation hole 36 and the second circulation hole 37 is discharged out of the urea solution tank 10. Some of the ammonia component flowing in the venting valve 30 through the first circulation hole 36 and the second circulation hole 37 is discharged out of the urea solution tank 10 through the venting hole 38 and the rest flows back into the urea solution tank 10 through the first circulation hole 36 or the second circulation hole 37.

The float 35 is disposed in the venting valve 30 to selectively open/close the first circulation hole 36, the second circulation hole 37, and the venting hole 38. The float 35 is lifted by buoyancy with rise of the urea solution U in the urea solution tank 10 and a hole-in buoyant hole 39 through which the urea solution U rising flows into the venting valve 30 is formed under the venting valve 30 so that the float 35 can operate in this way. That is, the urea solution U flowing inside through the buoyant hole 39 lifts the float 35. Further, the first circulation hole 36, second circulation hole 37, and venting hole 38 are closed by the lifted float 35.

The liquid filter 40 is disposed on the top of the urea solution tank 10, close to the venting valve 30. Although the liquid filter 40 of which the entire shape is a cylindrical case is shown in FIGS. 1 and 2, it is not limited thereto.

The connection pipe 32 connects the venting valve 30 with the liquid filter 40. That is, the inside of the venting valve 30 and the inside of the liquid filter 40 are connected by the connection pipe 32. The ammonia component passing through the venting hole 38 of the venting valve 30 flows into the liquid filter 40 through the connection pipe 32.

The liquid filter 40 has a filter body 45, an inlet 47, an outlet 48, a liquid trap 44, and a return valve 46.

The filter body 45 is a cylindrical case covering the constituent elements of the liquid filter 40. The lower portion of the filter body 45 may taper.

The inlet 47 is a hole formed so that the ammonia component passing through the connection pipe 32 flows into the filter body 45.

The outlet 48 is a hole formed so that the ammonia component flowing in the filter body 45 flows out of the filter body 45.

The liquid trap 44 is formed between the inlet 47 and the outlet 48. The liquid trap 44 may be formed in the shape of a plate. The liquid-state urea solution U in the ammonia component flowing inside through the inlet 47 is filtered by the liquid trap 44 and only the gas-state ammonia component flows outside through the outlet 48.

The return valve 46 may be disposed at the lowermost portion of the tapered filter body 45. The return valve 46 may be opened by the weight of the urea solution U filtered by the liquid trap 44 and dropping to the bottom of the filter body 45. That is, the return valve 46 is a one-way valve for returning the urea solution U filtered by the liquid trap 44 into the urea solution tank 10.

The exhaust valve 24, air inflow valve 26, and return valve 46 can be selectively opened/closed by electric control. The electric control of opening/closing the valves, including the exhaust valve 24, air inflow valve 26, and return valve 46 is apparent to those skilled in the art, so the detailed description is not provided.

The second venting pipe 42 communicates with the inside of the filter body 45 to receive the ammonia component passing through the outlet 48 of the liquid filter 40. One end of the second venting pipe 42 is connected with the filter body 45 and the other end extends down along the urea solution tank 10. That is, the second venting pipe 42 allows the ammonia component passing through the outlet 48 of the liquid filter 40 to flow down along the urea solution tank 10.

The pump module 50 pumps up the urea solution U in the urea solution tank 10 to the UREA-SCR system 100. The pump module 50 pumping up the urea solution U to the UREA-SCR system 100 is apparent to those skilled in the art, so the detailed description is not provided.

Hereinafter, filling urea solution U and the corresponding flow of ammonia component are described in detail with reference to FIGS. 3 to 5.

Figure 3:
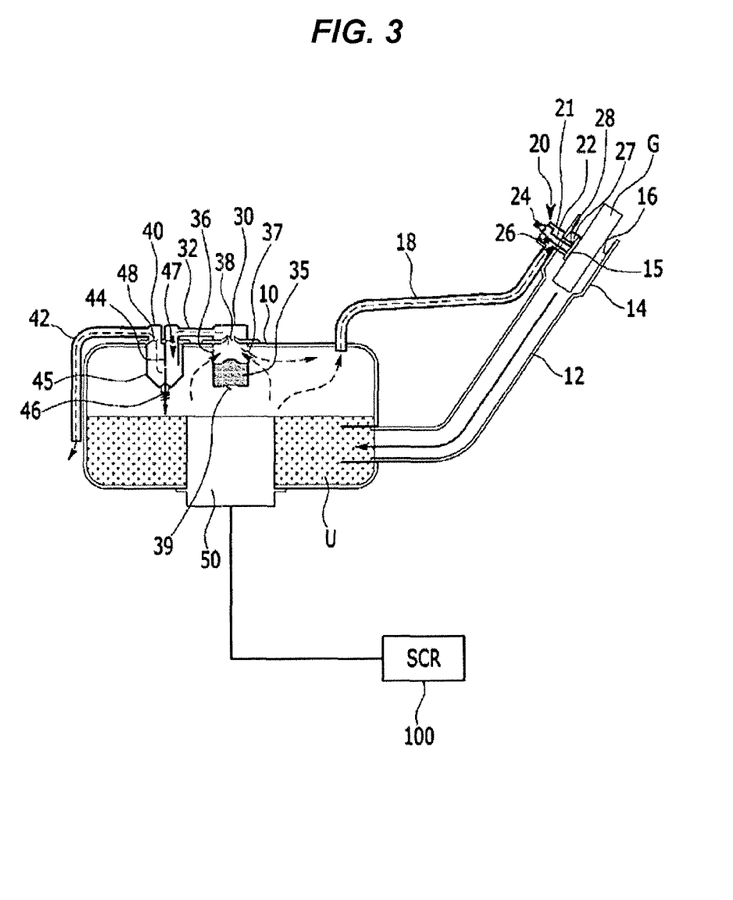
FIG. 3 is a view showing a flow of an ammonia component while a urea solution is injected into a urea solution tank according to an exemplary embodiment of the present invention.
Figure 4:
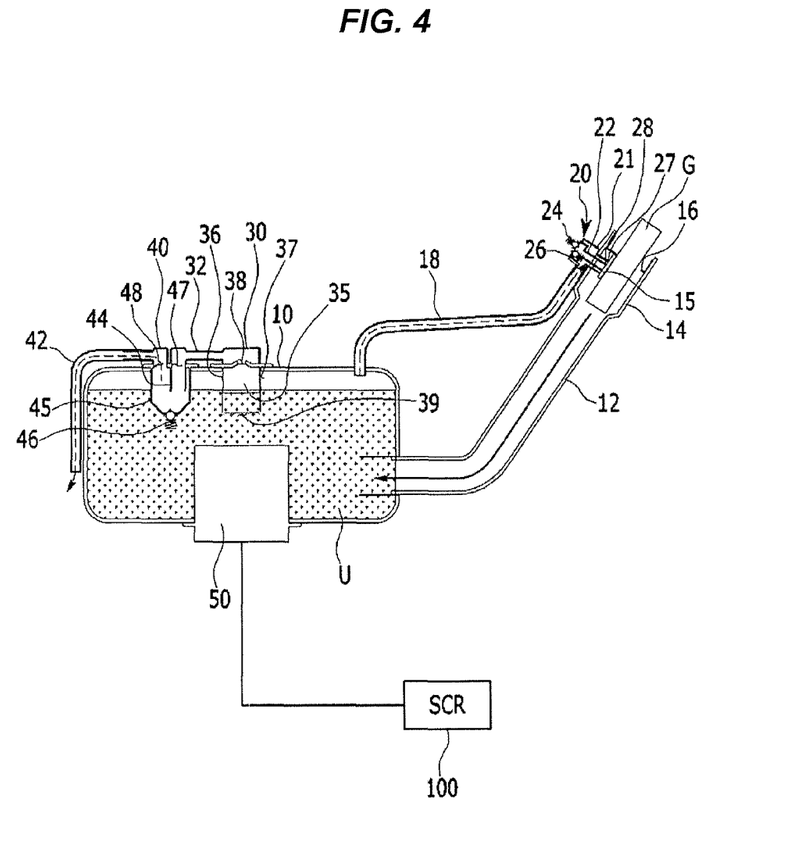
FIG. 4 is a view showing the urea solution tank closed while the urea solution is injected, according to an exemplary embodiment of the present invention.
Figure 5:
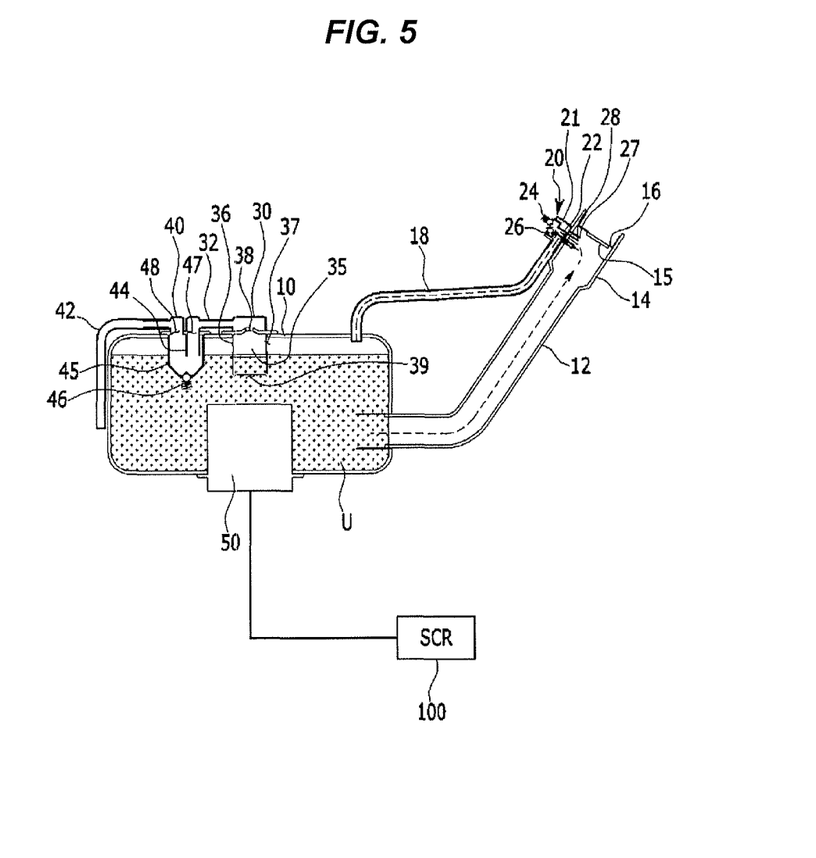
FIG. 5 is a view showing the flow of an ammonia component when the urea solution finishes being injected into the urea solution tank according to an exemplary embodiment of the present invention.

The urea solution to be filled is indicated by arrows and the flow of ammonia component is indicated by dotted arrows in FIGS. 3 to 5.

FIG. 3 is a view showing a flow of an ammonia component while a urea solution is injected into a urea solution tank according to an exemplary embodiment of the present invention.

As shown in FIG. 3, when the injection gun G for injecting urea solution U into the urea solution tank 10 is inserted in the injection gun pipe 14, the flap 15 closes the first outlet 27 and the second outlet 28 of the valve module 20. The injection gun G can be inserted without a gap in the urea solution injection port 16, The flap 15 opens the urea solution injection port 16 by being pushed by the injection gun G. The flap 15 closes the first outlet 27 and the second outlet 28, when it is open by the injection gun G. That is, the flap 15 is a plate that simultaneously closes the first outlet 27 and the second outlet 28.

The fact that the first outlet 27 and the second outlet 28 are closed means that one end of the first venting pipe 18 is closed. When the urea solution tank 10 is replenished with urea solution U, with the first outlet 27 and the second outlet 28 closed, ammonia component is not discharged through the first venting pipe 18. Accordingly, the stink of the ammonia component is not discharged to the outside of a vehicle body while the urea solution U is injected into the urea solution tank 10 with the injection gun G in the injection gun pipe 14.

The ammonia component flowing in the venting valve 30 through the first circulation hole 36 and the second circulation hole 37 is discharged to the bottom of the urea solution tank 10 sequentially through the venting hole 38, the connection pipe 32, the inlet 47, the liquid trap 44, the outlet 48, and the second venting pipe 42. The liquid-state urea solution U in the ammonia component filtered by the liquid trap 44 collects on the bottom of the liquid filter 40, and as the return valve 46 opens, the urea solution U collecting on the bottom of the filter body 45 returns to the urea solution tank 10.

The ammonia component discharged to the bottom of the urea solution tank 10 is mixed with air and discharged to an under body. Accordingly, the worker who injects the urea solution U into the urea solution tank 10 is not directly exposed to the stink of the ammonia component.

FIG. 4 is a view showing the urea solution tank closed while the urea solution is injected, according to an exemplary embodiment of the present invention.

As shown in FIG. 4, when the urea solution tank 10 is further replenished with urea solution U and the float 35 is lifted, the first circulation hole 36, the second circulation hole 37, and the venting hole 38 of the venting valve 30 are closed by the float 35. That is, with the first outlet 27 and the second outlet 28 closed by the flap 15, the first circulation hole 36, the second circulation hole 37, and the venting hole 38 are closed, such that the inside of the urea solution tank 10 is closed. The ammonia component remaining in the connection pipe 32, the liquid filter 40, and the venting pipe 42 is discharged through the second venting pipe 42, but other ammonia component is not discharged.

Replenishment of the urea solution U may be finished with closing of the urea solution tank 10. That is, since the urea solution tank 10 is closed when it is filled with urea solution U at a predetermined level, additional replenishment over the level can be prevented.

FIG. 5 is a view showing the flow of an ammonia solution when a urea solution finishes being injected into a urea solution tank according to an exemplary embodiment of the present invention.

As shown in FIG. 5, when the urea solution finished being injected into the urea solution tank 10, the injection gun G is separated. That is, the worker separates the injection gun G from the injection gun pipe 14.

When the injection gun G is separated from the injection gun pipe 14, the flap 15 returns to close the urea solution injection port 16. The flap 15 may be returned by an elastic member such as a spring. The method of returning the flap 15 may be changed in various ways, depending on the design of those skilled in the art.

As the flap 15 returns, the first outlet 27 and the second outlet 28 of the valve module 20 are opened. Since the venting hole 38 is closed by the float 35, the ammonia component is not discharged through the second venting pipe 42.

When the first outlet 27 and the second outlet 28 are opened, the ammonia component sent into the outer body 21 of the valve module 20 from the urea solution tank 10 through the first venting pipe 18 flows into the injection gun pipe 14 through the first outlet 27. The ammonia component flowing in the injection gun pipe 14 through the first outlet 27 flows into the inner body 22 of the valve module 20, together with the ammonia component flowing in the injection gun pipe 14 through the urea solution injection pipe 12 from the urea solution tank 10, through the second outlet 28.

When the ammonia component flows in the inner body 22, the exhaust valve 24 opens. Further, the ammonia component flowing in the inner body 22 is discharged to the outside of the valve module 20 through the exhaust valve 24.

In order to make the ammonia component be smoothly discharged through the exhaust valve 24, the air inflow valve 26 may open and the external air may flow into the inner body 22 through the air inflow valve 26.

The valve module 20 is disposed inside a vehicle body and the ammonia component is discharged inside the vehicle body through the exhaust valve 24.

Accordingly, the stink of the ammonia component is prevented from leaking outside the vehicle body. Since the ammonia component in the urea solution injection pipe 12 flows outside through the valve module 20 and fills the urea solution injection pipe 12 through the valve module 20, the ammonia component is prevented from flowing outside through the urea solution injection port 16 when the urea solution injection port 16 is open to replenish the urea solution tank 10 with urea solution U.

Since the ammonia component produced from the urea solution U is discharged through two venting pipes of the first venting pipe 18 and the second venting pipe 42, the ammonia component produced in the urea solution tank 10 can be smoothly discharged. In particular, when the venting hole 38 is closed to prevent the ammonia component from being discharged to the second venting pipe 42, the ammonia component is discharged through the first venting pipe 18, such that the ammonia component produced in the urea solution tank 10 can be smoothly discharged.

As described above, according to an exemplary embodiment of the present invention, ammonia component produced from urea solution U can be prevented from leaking outside a vehicle. Accordingly, the environment for the worker who injects the urea solution U into the urea solution tank 10 is improved and the satisfaction of the worker can be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A urea solution venting system for a vehicle which passes an ammonia component produced from a urea solution supplied for post-processing on an exhaust gas of the vehicle, the system comprising:
   a urea solution tank that stores a urea solution;
   a urea solution injection pipe that communicates with the urea solution tank to replenish the urea solution tank with the urea solution;
   a first venting pipe of which a first end communicates with the urea solution injection pipe and a second end is connected to the urea solution tank in order to send an ammonia component produced in the urea solution tank to the urea solution injection pipe;
   a valve module that is disposed between the first venting pipe and the urea solution injection pipe and includes:
      a first outlet for sending an ammonia component in the first venting pipe to the urea solution injection pipe; and
      a second outlet through which an ammonia component in the urea solution injection pipe is discharged to the outside;
   a urea solution injection port that is formed at a first end of the urea solution injection pipe to receive an injection gun for injecting the urea solution into the urea solution injection pipe; and
   a flap that is pivotally mounted to the urea solution injection port and selectively closes the urea solution injection port, wherein as the injection gun is inserted into the urea solution injection port, the flap opens the urea solution injection port and closes the first and the second outlets of the valve module by being pushed by the injection gun.

2. The system of claim 1, wherein the valve module comprises:
   an outer body that communicates with the first venting pipe and the urea solution injection pipe;
   an inner body that is disposed inside the outer body and communicates with the urea solution injection pipe; and
   an exhaust valve that is disposed at a first end of the inner body and selectively opens/closes the first end of the inner body, wherein the outer body communicates with the urea solution injection pipe through the first outlet and the inner body communicates with the urea solution injection pipe through the second outlet.

3. The system of claim 2, wherein when the flap returns to an initial closed position and the first outlet and the second outlet are opened, with separation of the injection gun, the ammonia component from the first venting pipe flowing in the urea solution injection pipe through the outer body and the ammonia component from the urea solution tank directly flowing to the urea solution injection pipe flow into the inner body.

4. The system of claim 3, wherein when the ammonia component flows into the inner body, the exhaust valve opens and the ammonia component in the inner body is discharged inside a vehicle body through the exhaust valve.

5. The system of claim 4, wherein the valve module further comprises:
   an air inflow valve that is disposed at the first end of the inner body and selectively opens/closes the first end of the inner body, wherein as the air inflow valve opens to take external air into the inner body, the ammonia component is smoothly discharged through the exhaust valve.

6. The system of claim 1, further comprising:
   a venting valve that is disposed on the top of the urea solution tank and selectively discharges the ammonia component produced in the urea solution tank;
   a liquid filter that communicates with the venting valve, receives a portion of the ammonia component produced in the urea solution tank passing through the venting valve, and collects a liquid-state urea solution in the portion of the ammonia component which passes through the venting valve; and
   a second venting pipe that communicates with the liquid filter to discharge a gas-state urea solution in the portion of the ammonia component passing through the venting valve and then passing through the liquid filter down along the urea solution tank.

7. The system of claim 6, wherein:
   the venting valve includes:
   at least one or more circulation holes through which the ammonia component produced in the urea solution tank flows into the venting valve;
   a venting hole through which the portion of the ammonia component passing through the venting valve flows out of the venting valve;
   a connection pipe that communicates with the liquid filter so that a portion of the ammonia component passing through the venting hole is sent to the liquid filter; and
   a float that is disposed in the venting valve to be lifted by buoyancy, as the urea solution supplied into the urea solution tank rises, wherein as the float is lifted, the circulation holes and the venting hole are closed.

8. The system of claim 7, wherein when the first outlet, the second outlet, and the venting hole are closed, the urea solution tank is closed.

9. The system of claim 6, wherein the liquid filter includes:
   a filter body of which an entire shape is a cylindrical case,
   a liquid trap that is disposed in the filter body and filters the liquid-state urea solution in the portion of the ammonia component passing through the liquid filter, and
   a return valve that selectively opens to return the liquid-state urea solution, which collects on a bottom of the filter body by the liquid trap, to the urea solution tank.

10. The system of claim 9, wherein the filter body tapers downward.

11. The system of claim 9, wherein the return valve is opened by a weight of the liquid-state urea solution collecting on the bottom of the filter body.

* * * * *